United States Patent [19]
Reichert et al.

[11] Patent Number: 5,877,109
[45] Date of Patent: Mar. 2, 1999

[54] CATALYST FOR THE GAS-PHASE POLYMERISATION OF CONJUGATED DIENES

[75] Inventors: Karl-Heinz Reichert; Peter Marquardt, both of Berlin; Christopher Eberstein, Bad Griesbach; Birgit Garmatter, Berlin; Gerd Sylvester, Leverkusen, all of Germany

[73] Assignee: Bayer AG, Leverkusen, Germany

[21] Appl. No.: 930,016

[22] PCT Filed: Mar. 22, 1996

[86] PCT No.: PCT/EP96/01275

§ 371 Date: Nov. 10, 1997

§ 102(e) Date: Nov. 10, 1997

[87] PCT Pub. No.: WO96/31543

PCT Pub. Date: Oct. 10, 1996

[30] Foreign Application Priority Data

Apr. 4, 1995 [DE] Germany ................. 195 12 127.9

[51] Int. Cl.$^6$ ........................................... C08F 4/44
[52] U.S. Cl. ................. 502/117; 502/62; 502/63; 502/65; 502/103; 502/104; 502/107; 502/108; 502/118; 502/120; 502/132; 526/129; 526/156; 526/164; 526/901
[58] Field of Search ................. 502/63, 65, 103, 502/104, 107, 108, 118, 120, 132, 117; 526/164

[56] References Cited

U.S. PATENT DOCUMENTS

| | | | |
|---|---|---|---|
| 4,260,707 | 4/1981 | Sylvester et al. | 526/340.4 X |
| 4,575,538 | 3/1986 | Hsieh et al. | 526/244 |
| 4,689,368 | 8/1987 | Jenkins | 526/164 X |
| 5,021,379 | 6/1991 | Martin et al. | 526/164 X |
| 5,428,119 | 6/1995 | Knauf et al. | 526/340.4 X |

FOREIGN PATENT DOCUMENTS 647657  4/1995  European Pat. Off. .

OTHER PUBLICATIONS

English Translation of International Preliminary Examination Report Dated Dec. 19, 1996.

Primary Examiner—Fred M. Teskin
Attorney, Agent, or Firm—Connolly & Hutz

[57] ABSTRACT

Catalysts comprising
  A) a rare earth alkoxide, a rare earth carboxylate and/or a rare earth coordination compound with diketones,
  B) an alumoxane and
  C) an inert, particulate, inorganic solid with a specific surface area of greater than 10 m$^2$/g and a pore volume of 0.3 to 15 ml/g
are excellently suited to the polymerisation of conjugated dienes, in particular butadiene, in the gas phase.

16 Claims, No Drawings

CATALYST FOR THE GAS-PHASE POLYMERISATION OF CONJUGATED DIENES

This invention relates to a novel catalyst, to the production thereof and to the use thereof for the polymerisation of conjugated dienes, in particular butadiene, in the gas phase.

Polybutadiene with an elevated proportion of cis-1,4 units has long been produced on a large industrial scale and used for the production of tyres and other rubber articles. Polymerisation is performed in this connection in the liquid phase using the most various catalyst systems. A particularly advantageous catalyst system for the production of polybutadiene with an elevated proportion of cis-1,4 units is described in European Patent 11 184. The catalyst system which is described therein and used for solution polymerisation of butadiene consists, for example, of a rare earth carboxylate, an aluminiumtrialkyl and/or alkylaluminium hydride and a further Lewis acid.

Polymerising conjugated dienes in solution has the disadvantage that when the unreacted monomer and the solvent are separated from the formed polymer, low molecular weight compounds may escape to the environment in exhaust air and effluent and must thus be appropriately disposed of.

It is also known to polymerise conjugated dienes without adding solvents in the liquid monomers. However, such a process has the disadvantage that a large quantity of heat is liberated on complete polymerisation, which is difficult to control and thus constitutes a certain potential hazard. Moreover, very high viscosities occur which require special apparatus. Here too, there is an environmental impact when the polymers are separated from the monomers.

In recent years, the gas phase process has proved particularly advantageous, particularly for the production of polyethylene and polypropylene and has become widely used industrially. The environmental advantages of the gas phase process are in particular that no solvents are used and emissions and effluent contamination may be reduced.

There has hitherto been no known process for the direct gas phase polymerisation of conjugated dienes, in particular of butadiene to yield polymers with an elevated cis content. One reason for this may be that the Ziegler-Natta catalysts based on titanium, cobalt, nickel or neodymium which are used for the solution polymerisation of conjugated dienes are not straightforwardly suitable for gas phase polymerisation, in particular due to their low productivity, i.e. the small quantity of polymer which may be produced with a certain quantity of catalyst. Thus, due to its rapidly falling activity when used in gas phase polymerisation, the catalyst described in EP 11 184 is virtually completely unsuitable to polymerise conjugated dienes, in particular butadiene, in the gas phase to yield polymers with an elevated proportion of cis-1,4 units (see comparative test).

A catalyst system which allows the polymerisation of conjugated dienes, in particular butadiene, in industrially useful yields, but still merits further improvement was described in German Patent Application P 43 34 045.

The object of the present invention is to provide improved catalysts for the polymerisation of conjugated dienes, in particular butadiene, in the gas phase which make it possible to produce good yields of polybutadiene with an elevated proportion of cis-1,4 units combined with an elevated molecular weight.

The present invention thus provides a catalyst comprising

A) a rare earth alkoxide (I), a rare earth carboxylate (II) and/or a rare earth coordination compound with diketones (III) of the following formulae:

(RO$_3$)M,  (I)

(R—CO$_2$)$_3$M,  (II)

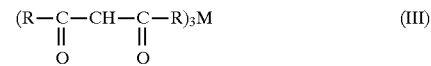

(R—C—CH—C—R)$_3$M  (III)
 ‖          ‖
 O          O

B) an alumoxane of the formulae (IV) to (V):

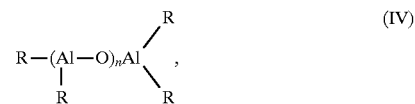

$$R-(Al-O)_n Al \diagup^{R}_{\diagdown R},\quad (IV)$$
$$\phantom{R-(}{\underset{R}{|}}$$

$$[(AlO)_{n+1}]_{\underset{R}{|}},\quad (V)$$

wherein, in the formulae,
M means a trivalent rare earth element with an atomic number of 57 to 71,
R is identical or different and means alkyl residues with 1 to 20 carbon atoms and
n means 1 to 50,
and
C) an inert, particulate, inorganic solid with a specific surface area of greater than 10 m$^2$/g (BET) and a pore volume of 0.30 to 15 ml/g, wherein the molar ratio of component A) to component B) is 1:1 to 1:50000 and 0.1 mmol to 1 mol of component A) are used per 100 g of component C).

In component A) of the catalyst, M means a trivalent rare earth element with the atomic numbers identified in the periodic system of 57 to 71.

Preferred compounds are those in which M means lanthanum, cerium, praseodymium or neodymium or a mixture of rare earth elements which contains at least 10 wt.% of at least one of the elements lanthanum, cerium, praseodymium or neodymium. Very particularly preferred compounds are those in which M means lanthanum or neodymium or a mixture of rare earths which contains at least 30 wt. % of lanthanum or neodymium.

Residues R in the formulae (I) to (III) which may be mentioned are in particular linear or branched alkyl residues with I to 20 carbon atoms, preferably 1 to 15 carbon atoms, such as methyl, ethyl, n-propyl, n-butyl, n-pentyl, isopropyl, isobutyl, tert.-butyl, 2-ethylhexyl, neopentyl, neooctyl, neodecyl, neododecyl.

Examples of component A) alkoxides which may be mentioned are:
neodymium(III) n-propanolate, neodymium(III) n-butanolate, neodymium(III) n-decanolate, neodymium(III) isopropanolate, neodymium(III) 2-ethyl-hexanolate, praseodymium(III) n-propanolate, praseodymium(III) n-butanolate, praseodymium(III) n-decanolate, praseodymium(III) isopropanolate, praseodymium(III) 2-ethylhexanolate, lanthanum(III) n-propanolate, lanthanum(III) n-butanolate, lanthanum (III) n-decanolate, lanthanum(III) isopropanolate, lanthanum(III) 2-ethylhexanolate, preferably neodymium(III) n-butanolate, neodymium(III) n-decanolate, neodymium(III) 2-ethylhexanolate.

Suitable component A) carboxylates are:
lanthanum(III) propionate, lanthanum(III) diethylacetate, lanthanum(III) 2-ethylhexanoate, lanthanum(III)

stearate, lanthanum(III) benzoate, lanthanum(III) cyclohexane carboxylate, lanthanum(III) oleate, lanthanum(III) versatate, lanthanum(III) naphthenate, praseodymium(III) propionate, praseodymium(III) diethylacetate, praseodymium(III) 2-ethylhexanoate, praseodymium(III) stearate, praseodymium(III) benzoate, praseodymium(III) cyclohexane carboxylate, praseodymium(III) oleate, praseodymium(III) versatate, praseodymium(III) naphthenate, neodymium (III) propionate, neodymium(III) diethylacetate, neodymium(III) 2-ethylhexanoate, neodymium(III) stearate, neodymium(III) benzoate, neodymium(III) cyclohexane carboxylate, neodymium(III) oleate, neodymium(III) versatate, neodymium(III) naphthenate, preferably neodymium(III) 2-ethylhexanoate, neodymium(III) versatate, neodymium(III) naphthenate. Neodymium versatate is particularly preferred.

Component A) coordination compounds which may be mentioned are:

lanthanum(III) acetylacetonate, praseodymium(III) acetylacetonate, neodymium(III) acetylacetonate, preferably neodymium(III) acetylacetonate.

The rare earth compounds may be used individually or mixed together.

Neodymium versatate, neodymium octanoate and/or neodymium naphthenate are very particularly preferably used as component A).

Examples of alumoxanes (IV) and (V) which may be mentioned are:

methylalumoxane, ethylalumoxane and isobutylalumoxane, preferably methylalumoxane and isobutylalumoxane.

Inert, particulate, inorganic solids with a specific surface area of greater than 10, preferably of 10 to 1000 m$^2$/g (BET) and a pore volume of 0.3 to 15, preferably of 0.5 to 12 ml/g are used as component C).

Specific surface area (BET) is determined in the conventional manner according to S. Brunauer, P. H. Emmett & Teller, *J. Amer. Chem. Soc.* 60 (2), 309 (1938), pore volume is determined by the centrifugation method according to M. McDaniel, *J. Colloid Interface Sci.* 78, 31 (1980).

Suitable inorganic solids are, in particular, silica gels, clays, aluminosilicates, talcum, zeolites, carbon black, inorganic oxides, such as silicon dioxide, aluminium oxide, magnesium oxide, titanium dioxide, silicon carbide, preferably silica gels, zeolites and carbon black, particularly preferably silica gel. Inert is taken to mean in this case that the solids neither have a reactive surface nor contain adsorbed material which prevent the formation of an active catalyst or react with the monomers.

The stated inert, inorganic solids which fulfil the above-stated specification and are consequently suitable for the application are described in greater detail, for example, in *Ullmanns Enzyclopädie der technischen Chemie* volume 21, pages 439 et seq. (silica gels), volume 23, pages 311 et seq. (clays), volume 14, pages 633 et seq. (carbon blacks), volume 23, pages 575 et seq. and volume 17, pages 9 et seq. (zeolites).

The inorganic solids may be used individually or mixed together.

The molar ratio in which the catalyst components A) to C) are used may be varied within broad limits.

The molar ratio of component A) to component B) is preferably 1:3 to 1:2000, particularly preferably 1:3 to 1:1000. 1 to 200 mmol of component A) are preferably used per 100 g of component C).

It is also possible to add still another component D) to the catalyst components A) to C). This component D) is a conjugated diene which may be the same diene as is subsequently to be polymerised with the catalyst. Butadiene and isoprene are preferably used.

If component D) is added to the catalyst, the quantity of D) is preferably 0.1 to 100 mol relative to 1 mol of component A), particularly preferably 0.1 to 10 mol relative to 1 mol of component A). 0.5 to 5 mol of D) relative to 1 mol of component A) are very particularly preferably used.

If components A), B) or C) are used in the form of a mixture of the various sub-components of A), B) or C), the quantity of the sub-components used may be varied at will. The most favourable quantity of the sub-components in the mixture may readily be determined by appropriate preliminary testing.

The present invention also provides the production of the catalyst system described above. This is produced by mixing components A) to D) in an inert solvent and/or diluent and, after the desired time, separating the solvent or diluent by distillation, optionally under a vacuum.

Inert solvents and/or diluents which may be used are aliphatic, cycloaliphatic and/or aromatic solvents, such as pentane, hexane, heptane, cyclohexane, benzene and/or toluene.

The sequence in which components A) to D) and the inert solvent are added to the reaction batch may be selected at will, if it has any influence at all upon the properties of the resultant catalyst. A slurry of component C) may, for example, be prepared in the inert solvent, component B) may then be added, followed by A) and finally D). It is also possible to distil off the inert solvent or diluent between the individual components before further components, optionally in a solvent, are added. The individual components may also be divided and the portions added at different times to the catalyst batch. A preferred embodiment, for example, consists in treating component C) with component B) in an inert solvent or diluent and then adding component A) and optionally D).

The quantity of the inert solvent and/or diluent used may be varied within wide limits. On economic grounds, the quantity is kept as small as possible. The minimum quantity is determined on the basis of the quantity and solubility of the individual components and the pore volume of component C). A quantity of 10 to 2000 parts of the solvent and/or diluent, relative to 100 parts of component C), is preferably used.

The catalyst may be produced over a broad temperature range. In general, the temperature is between the melting and boiling point of the inert solvent and/or diluent. The reaction is conventionally performed at temperatures of –20° to 80° C.

The invention also relates to the use of the catalysts according to the invention for the polymerisation of gaseous conjugated dienes, for example of 1,3-butadiene, isoprene, pentadiene or dimethylbutadiene.

Polymerisation proceeds by bringing the gaseous conjugated diene into contact with the described catalyst. Further gases may be added to the gaseous monomers for purposes of dilution, dissipation of heat or control of molecular weight. Polymerisation may be performed at pressures of 1 mbar to 50 bar, preferably of 1 to 20 bar.

Polymerisation is generally performed at temperatures of –20° to 250° C., preferably at 0° to 200° C., particularly preferably at 20° to 200° C.

Polymerisation may be executed in any apparatus suitable for gas phase polymerisation. A tubular reactor, rotary reactor or a fluidised bed reactor or a combination of these reactor types may thus, for example, be used. In order to avoid agglutination, it may be helpful to add known dusting agents. Dusting agents which may be used are any inert, finely divided solids, in particular also the inert, inorganic solids described as component C).

The polymers obtained have a cis-1,4 double bond content of approximately 60 to 99%. Molecular weight may be modified by the composition of the catalyst and by varying the polymerisation conditions.

Very high molecular weight polymers are conventionally produced by gas phase polymerisation with the catalyst system according to the invention, which polymers are obtainable only at extremely high cost by solution polymerisation due to their elevated viscosity and the possibility of transfer reactions due to the solvent used.

The resultant polymers may be compounded and vulcanised in the conventional manner.

In a common embodiment, 1,3-butadiene is polymerised as follows:

The catalyst consisting of components A) to C) and optionally D) is transferred into an apparatus which is suitable to maintain the pulverulent catalyst in motion. This may proceed, for example, by stirring, rotating and/or a gas stream. The inert gas initially located in the gas space, for example nitrogen, is replaced by the gaseous monomer. Polymerisation then begins immediately and the temperature rises. The monomer, optionally diluted with an inert gas, is introduced into the reactor at a rate such that the desired reaction temperature is not exceeded. The reaction temperature may be adjusted in a customary manner by heating or cooling. Polymerisation is terminated by shutting off the monomer supply. The polymer may be further treated in the known manner by deactivating the catalyst and treating the polymer with known antioxidants.

The following examples are intended to clarify the present described invention, but without restricting it thereto.

EXAMPLES

Example 1 a) Pretreatment of support:

Vulkasil S was used as the support. Vulkasil is a silica gel from Bayer AG with a BET surface area of 230 m$^2$/g. The pore volume is 2.95 ml/g. The Vulkasil S had been dried for 2 hours at 250° C. prior to use.

b) Catalyst production:

A catalyst was produced by combining 800 mmol of methylalumoxane (MAO) dissolved in 600 ml of toluene and 3.0 mmol of neodymium versatate (NDV) dissolved in 10 ml of cyclohexane in a 1 liter flask equipped with an N$_2$ feed line and a magnetic stirrer. The resultant mixture was poured onto 50 g of the support described in a). The batch was stirred overnight at room temperature and then evaporated to dryness under a vacuum. 100.6 g of a free flowing powder were isolated.

c) Polymerisation:

Polymerisation was performed in a rotary evaporator which was equipped with a magnetic stirring rod, a mercury pressure relief valve and connections to a vacuum pump and to supply gaseous nitrogen and butadiene together with a thermocouple reaching nearly to the bottom of the 1 liter flask. The gradient of the rotary evaporator was adjusted such that the axis of rotation formed an angle of 45° relative to that of the bar magnet. The total volume of the apparatus was 1.45 litres. 9.6 g of the catalyst were introduced into the flask under nitrogen. The apparatus was evacuated to 1 mbar and, while being stirred and rotated, was filled with gaseous, dry butadiene to a pressure of 1000 mbar and maintained at a pressure of between 950 and 1000 mbar. The temperature rose to 125° C. within 30 minutes. The butadiene supply was interrupted for 10 minutes. Thereupon, the pressure fell to 700 mbar and the internal temperature to 102° C. A butadiene pressure of 950 to 1000 mbar was maintained over the remaining course of the test and the internal temperature adjusted to 115° C. by means of a temperature controllable fan. 97 g of butadiene had been consumed after 1.5 hours.

After 6.5 hours, the apparatus was evacuated, filled with N$_2$ and the resultant, coarse-grained product removed from the flask. The weight was 217.7 g. The product was short-stopped and stabilised on a roll mill with 2 g of stearic acid and 2 g of Vulkanox BKF from Bayer AG.

33.6 g of the polybutadiene were kneaded at a temperature of 10° C. with 13.3 g of a highly aromatic extending oil (Purcell, from Stinnes) in a kneader supplied by Haake with a volume of 50 ml. The rotational speed of the rotors was 50 rpm. After 25 minutes, the oil-extended polybutadiene was removed from the kneader, stored for 24 hours at room temperature and the Mooney viscosity (ML-l+4', 100° C.) was determined as 138 MU. Cis-1,4 double bond content: 93%.

Example 2

Polymerisation:

8.2 g of the catalyst described in example 1 were used for the gas phase polymerisation of butadiene. Polymerisation was performed as described in example 1, with the difference that the temperature was maintained between 50° and 80° C. Yield was 88.1 g after 4.5 hours' reaction time.

33 g of this product were placed in a Haake kneader with an internal volume of 50 ml and kneaded for 30 minutes at a rotational speed of 50 rpm with 13 g of an aromatic mineral oil (Purcell, from Stinnes). The resultant product was further compacted on a roll mill and the Mooney viscosity measured. The Mooney viscosity of the oil-extended polybutadiene was 92 MU.

Example 3

0.41 g of silica gel (Grace, type 360, code 45) having a BET surface area of 360 m$^2$/g, were stirred for 10 minutes under a nitrogen atmosphere with 60 ml of MAO (10% solution in toluene) in a baked out 2-necked flask.

0.86 g of NDV solution (33 wt. % in cyclohexane) were then added and stirring continued for a further 2 hours. The solvents were then distilled off at 50° C./1 mbar and the residue dried at 50° C./10$^{-3}$ mbar. 6.03 g of a freely flowing powder were obtained.

Polymerisation:

Polymerisation was performed in a horizontal rotary tubular reactor with a volume of 300 ml. The reactor was charged with 0.5 g of the catalyst, heated to 50° C. and rotated at 50 rpm. The reactor was then pressurised to 2.8 bar with butadiene. After 11 minutes, the pressure had fallen to 0.9 bar.

The reactor was again pressurised to 2.8 bar with butadiene. After 16 minutes, the pressure had fallen to 1 bar. The reactor was again pressurised to 2.8 bar with butadiene. After 20 minutes, the pressure had fallen to 1 bar.

After a total polymerisation time of 38 minutes, the reactor was evacuated, filled with nitrogen and opened. 17.7 g of a white, coarse-grained solid had formed. This corresponds to an activity of 8750 mol of butadiene/mol Nd/h.

The product formed was stirred for 30 minutes with 100 ml of acetone in which 100 mg of Vulkanox BKF were dissolved and then evaporated to dryness.

Comparative example a) Catalyst production:

A catalyst was produced by mixing 120 ml of dry n-hexane, 15 mmol of DIBAH and 0.5 mmol of ethylaluminium sesquichloride (EASC) in a 1 liter flask equipped with an $N_2$ feed line and a magnetic stirrer. Once 0.25 g of butadiene had been introduced into the solution, 0.5 mmol of neodymium versatate (NVD) were added. After 5 minutes, the resultant mixture was evaporated under a vacuum at room temperature. The yield was 2.9 g.

c) Polymerisation

Polymerisation was performed in a rotary evaporator as described in example 1. The flask used during production of the catalyst was connected to the apparatus under nitrogen. The apparatus was evacuated to 1 mbar and, while being stirred and rotated, was filled with gaseous, dry butadiene.

A greasy mass was formed on the wall of the flask. The temperature rose to 59° C. within 2 minutes. Over this period, the pressure fell from 1000 to 920 mbar. Further butadiene was added to raise the pressure to 1000 bar. Butadiene was absorbed very slowly. When the pressure fell to 930 mbar, gaseous butadiene was added to raise the pressure to 1000 mbar. After one further hour, a soft lump of polymer had formed. No further butadiene was absorbed.

The yield was 11.3 g.

We claim:

1. A catalyst comprising
    A) a rare earth alkoxide (I), a rare earth carboxylate (II) and/or a rare earth coordination compound with diketones (III) of the following formulae:

 (RO$_3$)M,  (I)

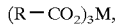 (R—CO$_2$)$_3$M,  (II)

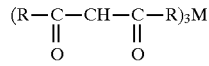
    (R—C—CH—C—R)$_3$M  (III)
    ‖   ‖
    O   O

B) an alumoxane of the formulae (IV) to (V):

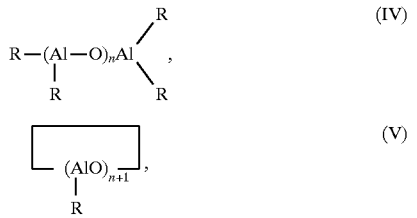

wherein, in the formulae,
    M means a trivalent rare earth element with an atomic number of 57 to 71,
    R is identical or different and means alkyl residues with 1 to 20 carbon atoms and
    n means 1 to 50,
    and
    C) an inert, particulate, inorganic solid with a specific surface area of greater than 10 m$^2$/g (BET) and a pore volume of 0.30 to 15 ml/g, wherein the molar ratio of component A) to component B) is 1:1 to 1:50000 and 0.1 mmol to 1 mol of component A) are used per 100 g of component C).

2. The catalyst according to claim 1, further comprising component D) a conjugated diene in a quantity of 0.1 to 100 mol relative to 1 mol of component A).

3. A process for producing the catalyst according to claim 2, the process comprising the steps of mixing components A) to D) in an inert, organic solvent, a diluent, or a mixture thereof, at temperatures of about −20° to 80° C., and separating the solvent, the diluent, or the mixture thereof.

4. The process according to claim 3, wherein the inert, organic solvent or the diluent is aliphatic, cycloaliphatic, aromatic, or a mixture thereof.

5. The process according to claim 4, wherein the inert, organic solvent or the diluent comprises pentane, hexane, heptane, cyclohexane, benzene, toluene, or a mixture thereof.

6. A process for producing the catalyst according to claim 1, the process comprising the steps of mixing components A) to C) in an inert, organic solvent, a diluent, or a mixture thereof, at temperatures of about −20° to 80° C., and separating the solvent, the diluent, or the mixture thereof.

7. The catalyst according to claim 1, wherein M represents lanthanum, cerium, praseodymium, neodymium, a mixture thereof, or a mixture of rare earth elements including at least 10% by weight of at least one of lanthanum, cerium, praseodymium or neodymium.

8. The catalyst according to claim 1, wherein R represents linear or branched alkyl residues comprising 1 to 15 carbon atoms.

9. The catalyst according to claim 8 wherein the alkyl residues comprise methyl, ethyl, n-propyl, n-butyl, n-pentyl, isopropyl, isobutyl, tert.-butyl, 2-ethylhexyl, neopentyl, neooctyl, neodecyl, or neododecyl.

10. The catalyst according to claim 1, wherein the rare earth alkoxide (I) comprises neodymium(III) n-propanolate, neodymium(III) n-butanolate, neodymium(III) n-decanolate, neodymium(III) isopropanolate, neodymium (III) 2-ethyl-hexanolate, praseodymium(III) n-propanolate, praseodymium(III) n-butanolate, praseodymium(III) n-decanolate, praseodymium(III) isopropanolate, proseodymium(III) 2-ethylhexanolate, lanthanum(III) n-propanolate, lanthanum(III) n-butanolate, lanthanum(III) n-decanolate, lanthanum(III)isopropanolate, or lanthanum (III) 2-ethylhexanolate.

11. The catalyst according to claim 1, wherein the rare earth carboxylate(II) comprises lanthanum(III) propionate, lanthanum(III) diethylacetate, lanthanum(III) 2-ethylhexanoate, lanthanum(III) stearate, lanthanum(III) benzoate, lanthanum(III) cyclohexane carboxylate, lanthanum(III) oleate, lanthanum(III) versatate, lanthanum (III) naphthenate, praseodymium(III) propionate, praseodymiun(III) diethylacetate, praseodymium(III) 2-ethylhexanoate, praseodymium(III) stearate, praseodymium(III) benzoate, praseodymium(III) cyclohexane carboxylate, praseodymium(III) oleate, praseodymium (III) versatate, praseodymium (III) naphthenate, neodymium (III) propionate, neodymium(III) diethylacetate, neodymium(III) 2-ethylhexanoate, neodymium(III) stearate, neodymium(III) benzoate, neodymium(III) cyclohexane carboxylate, neodymium(III) oleate, neodymium(III) octanoate, neodymium(III) versatate, or neodymium(III) naphthenate.

12. The catalyst according to claim 1, wherein the rare earth coordination compound with diketones(III) comprise lanthanum(III) acetylacetonate, praseodymium(III) acetylacetonate, or neodymium(III) acetylacetonate.

13. The catalyst according to claim 1, wherein the alumoxane (IV and V) comprises methylalumoxane, ethylalumoxane, or isobutylalumoxane.

14. The catalyst according to claim 1, wherein the inert, particulate, inorganic solid comprises silica gels, clays, aluminosilicates, talcum, zeolites, carbon black, inorganic oxides, or silicon carbide.

15. A catalyst comprising the admixture of components A), B) and C) according to claim 1.

16. A catalyst comprising the admixture of components A), B), C) and D) according to claim 2.

* * * * *